United States Patent
Lunzman

(12) 
(10) Patent No.: US 6,725,131 B2
(45) Date of Patent: Apr. 20, 2004

(54) SYSTEM AND METHOD FOR CONTROLLING HYDRAULIC FLOW

(75) Inventor: Stephen V. Lunzman, Chillicothe, IL (US)

(73) Assignees: Caterpillar Inc, Peoria, IL (US); Shin Caterpillar Mitsubishi Ltd (JP)

( * ) Notice: Subject to any disclaimer, the term of this patent is extended or adjusted under 35 U.S.C. 154(b) by 163 days.

(21) Appl. No.: 10/029,243

(22) Filed: Dec. 28, 2001

(65) Prior Publication Data

US 2003/0125840 A1 Jul. 3, 2003

(51) Int. Cl.⁷ .............................................. G05D 11/00
(52) U.S. Cl. ..................... 700/282; 700/90; 700/275; 137/1; 137/12; 702/45
(58) Field of Search ................... 700/282, 90, 275; 137/1, 2, 12; 702/45, 47

(56) References Cited

U.S. PATENT DOCUMENTS

| | | | |
|---|---|---|---|
| 5,218,820 A | 6/1993 | Sepehri et al. ................ 60/463 |
| 5,947,140 A | 9/1999 | Aardema et al. ............... 137/1 |
| 5,960,695 A | 10/1999 | Aardema et al. ............. 91/433 |

OTHER PUBLICATIONS

DeBoer, Chris, et al, "Velocity Control of Hydraulic Cylinders with Only Pressure Feedback," School of Mechanical Engineering, Purdue University, Systems and Controls Research, Electrohydraulics/Diagnosotics, Caterpillar Inc., pp. 1 and 2, 2001.

Primary Examiner—Jayprakash N. Gandhi
(74) Attorney, Agent, or Firm—Finnegan, Henderson, Farabow, Garrett & Dunner

(57) ABSTRACT

A method is provided for controlling hydraulic flow through a valve in fluid communication with a pump and a hydraulic actuator. The method includes monitoring load pressure of the valve, and selecting a flow limit and a pressure limit of the valve. A flow-pressure relationship in the valve is determined based on the flow limit, the pressure limit, and a desired flow-pressure characteristic. A hydraulic flow rate command is computed based on the determined flow pressure relationship and the monitored load pressure of the valve.

19 Claims, 2 Drawing Sheets

SYSTEM AND METHOD FOR CONTROLLING HYDRAULIC FLOW

TECHNICAL FIELD

This invention relates to a system and method for controlling hydraulic flow through a valve. More particularly, the invention is directed to a system and method for controlling hydraulic flow through a valve by monitoring load pressure of the valve.

BACKGROUND

It is well known to use a valve in a hydraulic circuit of a machine, such as an excavator or a loader, to control a hydraulic flow from a pump to a cylinder, a hydraulic motor, or any other device. When an operator of the machine actuates a valve by, for example, moving a lever, pressurized hydraulic fluid flows from the pump to the device through the valve. The amount of the hydraulic flow to the device can be controlled by changing the displacement of a valve spool located in the valve.

Typically, a valve used to control hydraulic flow is equipped with a valve spool having metering slots that control flow through the valve. The valve may control various types of hydraulic flows, such as a flow from a pump to a cylinder or a cylinder to a reservoir tank. One of the most prevalent hydraulic circuits used to control hydraulic flow to manipulate the device is an open center system. In the open center system, a hydraulic flow to the device decreases as the load pressure increases. Thus, the open center system provides the machine operator with a feel for the load on the cylinder or device.

To achieve this flow-pressure characteristic, the open center system uses a bypass flow path that passes the hydraulic fluid from the pump to the reservoir. When a machine having an open center system is subjected to a certain load, some hydraulic fluid escapes from the pump to the reservoir through the bypass flow path. As the load pressure increases, the bypass flow increases. Since the hydraulic flow in the bypass flow path passes from the pump to the reservoir without doing work, the open center system wastes hydraulic energy, and thus the system may be inefficient.

For some cases, the machine operator may need smooth acceleration of high-inertia or mass loads rather than a feel for the load. In such cases, it may be desirable to provide a hydraulic circuit having flow-pressure characteristics different from the open center system.

In U.S. Pat. No. 5,218,820, a hydraulic flow control system is disclosed for controlling a hydraulic actuator. The hydraulic control system includes a valve, cylinder pressure sensors, and a computer programmed with a model of the hydraulic actuators under different load conditions. Based on signals from the pressure sensors, the computer sends a signal to control the valve. This system, however, does not provide flexibility to change flow-pressure characteristics.

Thus, it is desirable to provide a hydraulic flow control system that is efficient and provides flexibility to accommodate different flow-pressure characteristics of the hydraulic circuit. The present invention is directed to solving one or more of the problems associated with prior art designs.

SUMMARY OF THE INVENTION

In one aspect, a method is provided for controlling hydraulic flow through a valve in fluid communication with a pump and a hydraulic actuator. The method includes monitoring load pressure of the valve and selecting a flow limit and a pressure limit of the valve. A flow-pressure relationship in the valve is determined based on the flow limit, the pressure limit, and a desired flow-pressure characteristic. A hydraulic flow rate command is computed based on the determined flow pressure relationship and the monitored load pressure of the valve.

In another aspect, a method provides a plurality of flow-pressure relationships in a valve in fluid communication with a pump and a hydraulic actuator. The method includes selecting a flow limit and a pressure limit of the valve. A first flow-pressure relationship of the plurality of flow-pressure relationships in the valve is determined based on the flow limit, the pressure limit, and a first desired flow-pressure characteristic. A second flow-pressure relationship of the plurality of flow-pressure relationships in the valve is determined based on the flow limit, the pressure limit, and a second desired flow-pressure characteristic different from the first desired flow-pressure characteristic.

In another aspect, a system is provided for controlling hydraulic flow in a valve in fluid communication with a pump and a hydraulic actuator. The valve has an inlet port and an outlet port. The system includes a pressure sensor assembly for monitoring load pressure and a flow controller electrically coupled to the pressure sensor assembly. The controller includes a flow-pressure control unit is configured to determine a flow-pressure relationship in the valve based on a flow limit and a pressure limit of the valve, and a desired flow-pressure characteristic.

In another aspect, a method is provided for controlling movement of a hydraulic actuator. The method includes storing predetermined valve operational characteristics and generating input signals based on movement of an input device. A flow-pressure relationship is simulated based on the input signals and the predetermined valve operational characteristics. A valve command is generated based on the flow-pressure simulation. Movement of the actuator is caused through communication of the valve command with a control valve in fluid communication with the actuator.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an exemplary embodiment of the invention and together with the description, serve to explain the principles of the invention.

DETAILED DESCRIPTION

Reference will now be made in detail to an exemplary embodiment of the invention, which is illustrated in the accompanying drawings. Wherever possible, the same reference numbers will be used throughout the drawings to refer to the same or like parts.

Figure 1:
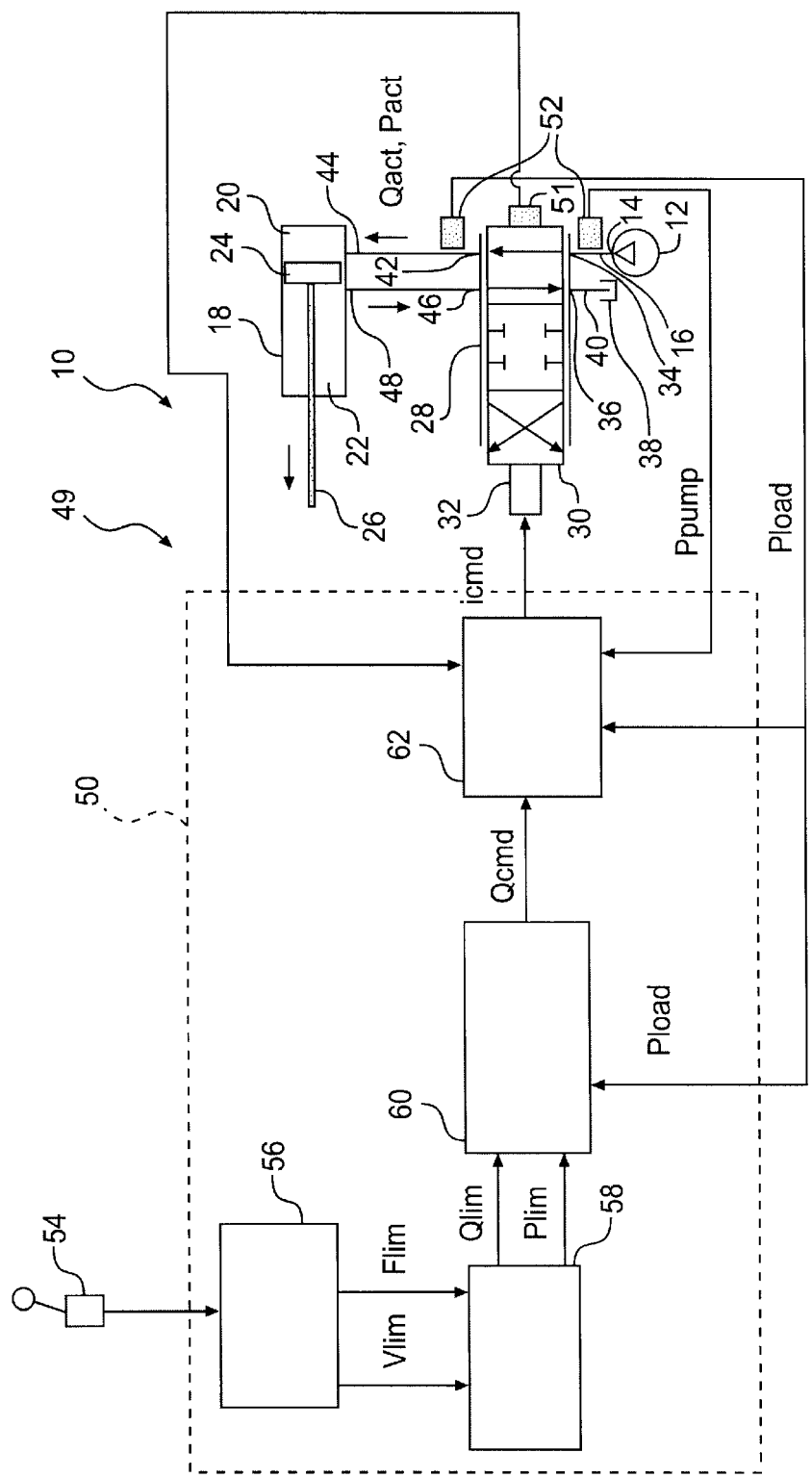
FIG. 1 is a schematic and diagrammatic representation of a machine having a hydraulic flow control system according to one exemplary embodiment of the present invention.

FIG. 1 schematically and diagrammatically illustrates a machine having a system for controlling hydraulic flow through a valve according to one exemplary embodiment of the invention. The machine 10 shown in FIG. 1 may be an excavator, a loader, or any other piece of equipment utilizing a hydraulic system to move a load. The machine 10 includes a pump 12 typically driven by a motor (not shown in the figure), such as an engine. The pump 12 has a pump outlet port 14 connected to a conduit 16.

In one exemplary embodiment, the machine 10 includes a double-acting cylinder 18. The double-acting cylinder 18 has a pair of actuating chambers, namely a head-end actuating chamber 20 and a rod-end actuating chamber 22. The head-end actuating chamber 20 and the rod-end actuating chamber 22 are separated by a piston 24 having a piston rod 26. The double-acting cylinder 18 may be a hydraulic cylinder or any other suitable implement device used for raising, lowering, or otherwise moving a portion of the machine 10. Though the embodiment is described with respect to a hydraulic cylinder, this invention is not limited to a cylinder, and the machine 10 may include a hydraulic motor or any other suitable implement.

The machine 10 includes a hydraulic flow control system 49. The hydraulic flow control system 49 has a valve 28 connected to the pressure outlet port 14 of the pump 12 via the conduit 16. The valve 28 has a valve spool 30. In the embodiment shown in FIG. 1, the valve 28 is a four-way proportional valve. However, the invention is not limited to a four-way proportional valve, and the valve 28 can be any other suitable valve known to those skilled in the art. By means of example only, it is contemplated that the valve 28 may be an independent metering valve (IMV). As is well known to those skilled in the art, an IMV typically has a plurality of independently operable valves that may be in fluid communication with a pump, a cylinder, a reservoir, and/or any other device present in a hydraulic circuit. The IMV allows independent metering of each of the valves to control hydraulic flow in multiple hydraulic paths. In one exemplary embodiment, the hydraulic flow control system 49 may control each of the independently operable valves in the IMV.

The hydraulic flow control system 49 also has an actuator 32 to move the valve spool 30 to a desired position to thereby control the hydraulic flow through the valve 28. The displacement of the valve spool 30 changes the flow rate of the hydraulic fluid through the valve 28. The actuator 32 may be a solenoid actuator or any other actuator known to those skilled in the art.

The valve 28 has a first port 34 connected to the pump 12 by the conduit 16, a second port 36 connected to a reservoir tank 38 by a conduit 40, a third port 42 connected to the head-end actuating chamber 20 of the cylinder 18 by a conduit 44, and a fourth port 46 connected to the rod-end actuating chamber 22 of the cylinder 18 by a conduit 48. The valve 28 has a first position and a second position. In the first position (shown in FIG. 1), the first port 34 and the third port 42 are in fluid communication, and the valve 28 passes the fluid from the pump 12 to the head-end actuating chamber 20 of the cylinder 18. At the same time, the second port 36 and the fourth port 46 are in fluid communication, and the valve 28 exhausts the fluid from the rod-end actuating chamber 22 to the reservoir tank 38.

Alternatively, in the second position (not shown in FIG. 1), the first port 34 and the fourth port 46 are in fluid communication so that the valve 28 passes the fluid from the pump 12 to the rod-end actuating chamber 22. Simultaneously, the second port 36 is in fluid communication with the third port 42 to pass the fluid from the head-end actuating chamber 20 to the reservoir tank 38. The valve spool 30 of the valve 28 can be moved by the actuator 32 to meter the fluid flow through the valve 28, as well as to move the valve 28 between the first position and the second position. The valve 28 may also have a neutral position. In one exemplary embodiment, the valve 28 may include a spool position sensor 51 for sensing the position of the spool valve 30. The spool position sensor 51 may be an optical sensor or any other suitable sensor capable of sensing the position of the spool valve 30.

As illustrated in FIG. 1, the hydraulic flow control system 49 includes a pressure sensor 52 to monitor an outlet port pressure (load pressure as shown in FIG. 1) of the valve 28. Also, the hydraulic flow control system 49 may include a pressure sensor 52 to monitor an inlet port pressure of the valve 28 to determine a pressure difference or pressure drop across the valve 28. In the embodiment shown in FIG. 1, the pressure sensors 52 are located at the conduits 16, 44. When the fluid passes from the pump 12 to the head-end actuating chamber 20, the sensor 52 at the conduit 16 monitors the inlet port pressure and the sensor 52 at the conduit 44 monitors the outlet port pressure, which is load pressure in this embodiment. From the pressure readings from the pressure sensors 52 at the conduits 16, 44, the pressure drop across the valve 28 for the pump-to-cylinder flow can be determined.

The hydraulic flow control system 49 may be provided with sensors (not shown) at the conduits 40, 48 that monitor the pressure drop across the valve 28 for the cylinder-to-tank flow. In this case, the sensor (not shown) at the conduit 48 may monitor the load pressure.

When the fluid passes from the pump 12 to the rod-end actuating chamber 22, the sensors 52 at the conduits 16, 48 monitor the pressure drop across the valve 28 for the pump-to-cylinder flow. In this case, the sensor 52 at the conduit 16 monitors the inlet port pressure and the sensor 52 at the conduit 48 monitors the outlet port pressure, which is the load pressure. The sensors 52 at the conduits 40, 44 may also monitor the pressure drop across the valve 28 for the cylinder-to-tank flow.

The locations and number of the sensors 52 of the present invention are not limited to the specific arrangement illustrated in FIG. 1. The pressure sensors 52 can be placed at any location suitable to determine desired load pressure of the valve 28 or a desired pressure drop across the valve 28. One skilled in the art will appreciate that any pressure sensor assembly capable of ascertaining load pressure of the valve 28 and a pressure drop across valve 28 may be utilized.

The hydraulic flow control system 49 includes a controller 50 electrically coupled to the actuator 32 and the pressure sensors 52. The controller 50 receives pressures readings, $P_{pump}$ and $P_{load}$, from the pressure sensors 52 at a pump side and a cylinder side, respectively, of the valve 28. The controller 50 also sends an electrical command signal, $i_{cmd}$, to the actuator 32. In response to the electrical command signal, the actuator 32 applies a varying force to controllably move the valve spool 30 to a desired displacement to control the hydraulic flow through the valve 28.

An operator input 54, such as a lever, may be electrically connected to the controller 50, and a lever command may be sent from the operator input 54 to the controller 50 to control a hydraulic flow rate, $Q_{act}$, through the valve 28. By manipulating the operator input 54, the operator can control the cylinder 18 in a desired manner.

In the embodiment shown in FIG. 1, the controller 50 may include a modulation control unit 56 coupled to the operator input 54. The modulation control unit 56 translates signals from the operator input 54 into a cylinder velocity limit, $V_{lim}$, and a cylinder force limit, $F_{lim}$. In one embodiment, the modulation control unit 54 may include two tables. One table contains the cylinder velocity limits, $V_{lim}$, with respect to various lever positions of the operator input 54. The other table contains the cylinder force limits, $F_{lim}$, with respect to various lever positions of the operator input 54. These tables may be created prior to the operation of the machine 10, for example, during either a test run of the hydraulic flow control system 49 or a lab test, and are prestored in the modulation control unit 56. The values in the tables can be adjusted to create a desirable relationship between the lever position and the cylinder velocity limit, $V_{lim}$, or the cylinder force limit, $F_{lim}$. Using the tables, the modulation control unit 56 translates the signals from the operator input 54, such as a lever position, into the cylinder velocity limit, $V_{lim}$, and the cylinder force limit, $F_{lim}$.

The controller 50 may also include a cylinder transform unit 58 coupled to the modulation control unit 56. The cylinder transform unit 58 computes a valve flow limit, $Q_{lim}$, and a valve pressure limit, $P_{lim}$, from the cylinder velocity limit, $V_{lim}$, and the cylinder force limit, $F_{lim}$, which are provided by the modulation control unit 56. In one exemplary embodiment, a known mathematical formula is used to convert the cylinder velocity limit, $V_{lim}$, into the valve flow limit, $Q_{lim}$, and the cylinder force limit, $F_{lim}$, into the valve pressure limit, $P_{lim}$, based on known dimensions of the cylinder 18, such as a piston diameter and a piston rod diameter. For example, the valve flow limit, $Q_{lim}$, may be determined by the cylinder velocity limit, $V_{lim}$, multiplied by a working area of the piston. The valve pressure limit, $P_{lim}$, may be determined by the cylinder force limit, $F_{lim}$, divided by the working area of the piston. The method of the conversion is not limited to the above described method. As is well understood by the one skilled in the art, the conversion of the cylinder velocity and force limits into the valve flow and pressure limits may be performed by other methods.

The controller 50 includes a flow-pressure control unit 60. In the embodiment shown in FIG. 1, the flow-pressure control unit 60 is coupled to the cylinder transform unit 58 and the pressure sensor 52 at the conduit 44. The flow-pressure control unit 60 receives the valve flow and pressure limits, $Q_{lim}$ and $P_{lim}$, from the cylinder transform unit 58, and load pressure signal, $P_{load}$, from the pressure sensor 52 at the conduit 44. Based on the valve flow limit, $Q_{lim}$, and the valve pressure limit, $P_{lim}$, and a desired flow-pressure characteristic, the flow-pressure control unit 60 determines a flow-pressure relationship in the valve 28. By using the determined flow-pressure relationship and the load pressure signal from the pressure sensor 52, the flow-pressure control unit 60 computes a hydraulic flow rate command, $Q_{cmd}$.

Figures 2, 3:
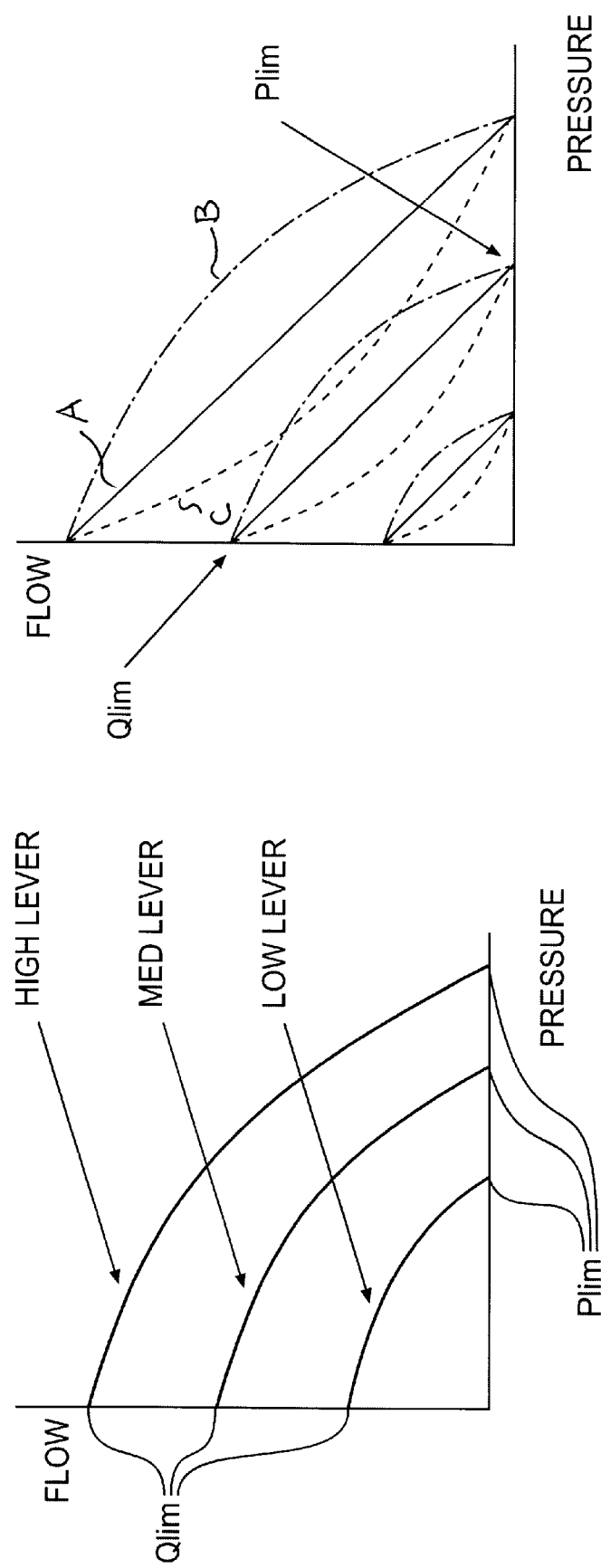
FIG. 2 is a flow-pressure control diagram illustrating a flow-pressure relationship of an open center system.
FIG. 3 is a flow-pressure control diagram illustrating various flow-pressure relationships of the exemplary hydraulic flow control system of FIG. 1.

FIG. 2 illustrates a flow-pressure control diagram having a typical flow-pressure relationship of an open center system. The diagram shows three flow-pressure curves for different signals (indicated as different lever positions in FIG. 2) from the operator input 54. Each flow-pressure curve represents a flow-pressure relationship for a corresponding lever position (high, medium, and low lever positions). In one exemplary embodiment, the high, medium, and low lever positions may be set at 100%, 50%, and 10% of the maximum lever position, respectively.

In FIG. 2, each curve represents a flow-pressure relationship in the valve 28, and the shape of the curves represents a flow-pressure characteristic in the valve 28. All of the curves in FIG. 2 have a similar shape, which is a typical flow-pressure characteristic of an open center system. In the flow-pressure relationship of the curves in FIG. 2, the flow-pressure characteristic is such that the flow decreases at a certain rate to provide a load feel to the operator as the pressure increases. Each curve extends between the valve flow limit, $Q_{lim}$, and the valve pressure limit, $P_{lim}$. In the diagram, the valve flow limit, $Q_{lim}$, defines the point on the curve where the valve pressure is equal to zero, and the valve pressure limit, $P_{lim}$, defines the point on the curve where the valve flow is equal to zero.

The flow-pressure control diagram of FIG. 3 illustrates various flow-pressure relationships of the hydraulic flow control system 49. In this exemplary embodiment, the diagram shows curves for three different lever positions, namely high, medium, and low lever positions. Each curve extends between the valve flow limit, $Q_{lim}$, and the valve pressure limit, $P_{lim}$.

For each lever position, the diagram in FIG. 3 illustrates different flow-pressure characteristics as shown by a solid line, A, a first dotted curve, B, and a second dotted curve, C. Each of the line and curves has its own unique flow-pressure characteristic depicted by the shape of the curves or the slope of the line. The shape of the curve or the slope of the line may be altered to be suitable for a particular application of the device. For example, the first dotted curve B defines a flow-pressure relationship of a typical open center system that may be suitable for moving an implement of an excavator. The solid line A may be suitable for a swing circuit of an excavator. The second dotted line C may indicate a flow-pressure characteristic that is suitable for a smooth acceleration of a heavy load.

The flow-pressure control unit 60 may include equations, tables, or maps to be used to generate the slopes or shapes of the curves or any other flow-pressure characteristic that can be tuned to meet the requirements for a desired application, such as a smooth acceleration of a massive load, or a load-feel to the operators. Based on the desired flow-pressure characteristic, and the valve flow limit, $Q_{lim}$, and the valve pressure limit, $P_{lim}$, the flow-pressure control unit 60 determines the flow-pressure relationships, as defined by the lines and curves in FIG. 3.

In one exemplary embodiment, a single flow-pressure characteristic may be preprogrammed into the flow-pressure control unit 60. In another exemplary embodiment, the flow-pressure control unit 60 may be preprogrammed with multiple flow-pressure characteristics, and the operator may select one flow-pressure characteristic suitable for a particular application.

Based on the determined the flow-pressure relationship and the load pressure signal, $P_{load}$, from the pressure sensor 52, the flow-pressure control unit 60 computes and outputs a hydraulic flow rate command, $Q_{cmd}$.

Referring to FIG. 1, the controller 50 may also include an electronic flow control unit 62 coupled to the flow-pressure control unit 60 and the pressure sensors 52. Based on the pressure signals received from the pressure sensors 52 and the hydraulic flow rate command, $Q_{cmd}$, the electronic flow control unit 62 computes a command signal, $i_{cmd}$, to the actuator 32. In one embodiment, the electronic flow control unit 62 may be coup led to the spool position sensor 51.

In an alternative embodiment, an electro-hydraulic pressure compensated valve (PC valve) and a proportional priority pressure compensated valve (PPPC valve), may be used in place of the valve 28, the actuator 32, and the electronic flow control unit 62.

Industrial Applicability

Referring to FIG. 1, the pressure sensors 52 monitor the inlet port and outlet port pressures of the valve 28. In this arrangement, the outlet port pressure is load pressure. The pressure readings or signals of the inlet port and outlet port pressures, $P_{pump}$ and $P_{load}$, are fed to the electronic flow control unit 62. The pressure reading or signal of the outlet port or load pressure, $P_{load}$, is also fed to the flow-pressure control unit 60.

When the operator manipulates the operator input 54, for example, by moving a lever, the operator input 54 provides the lever command to the modulation control unit 56. Based on the lever command, the modulation control unit 56 determines the corresponding cylinder velocity limit, $V_{lim}$, and the cylinder force limit, $F_{lim}$.

The cylinder velocity limit, $V_{lim}$, and the cylinder force limit, $F_{lim}$, are then fed to the cylinder transform unit 58. The cylinder transform unit 58 computes a valve flow limit, $Q_{lim}$, and a valve pressure limit, $P_{lim}$, from the cylinder velocity limit, $V_{lim}$, and the cylinder force limit, $F_{lim}$. Since some dimensions of the cylinder 18, such as the piston diameter and the piston rod diameter, are known, the valve flow limit, $Q_{lim}$, and the valve pressure limit, $P_{lim}$, can be determined from the cylinder velocity limit, $V_{lim}$, and the cylinder force limit, $F_{lim}$, by known mathematical formulas.

The valve flow limit, $Q_{lim}$, and the valve pressure limit, $P_{lim}$ are subsequently fed to the flow-pressure control unit 60. The flow-pressure control unit 60 may include one or more preprogrammed flow-pressure characteristics. By using the valve flow and pressure limits, $Q_{lim}$ and $P_{lim}$, as reference points, and the flow-pressure characteristics, the flow-pressure control unit 60 generates a flow-pressure relationship in the valve 28. From the determined relationship and the load pressure reading, $P_{load}$, from the pressure sensor 52, the flow-pressure control unit 60 computes the hydraulic flow rate command, $Q_{cmd}$.

In this exemplary embodiment, the hydraulic flow rate command, $Q_{cmd}$, is fed to the electronic flow control unit 62. The electronic flow control unit 62 computes from the hydraulic flow rate command, $Q_{cmd}$, the command signal, $i_{cmd}$, to the actuator 32, and the actuator 32 moves the valve spool 30 to achieve a desired hydraulic flow through the valve 28.

Accordingly, the present invention provides a hydraulic flow control system that is efficient and provides flexibility to accommodate different flow-pressure characteristics of the hydraulic circuit. The hydraulic flow control system according to this invention can provide accurate and flexible control of hydraulic flow in a variety of work machines.

It will be apparent to those skilled in the art that various modifications and variations can be made in the valve flow control system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling hydraulic flow through a valve in fluid communication with a pump and a hydraulic actuator, comprising:

monitoring load pressure of the valve;

selecting a flow limit and a pressure limit of the valve;

determining a flow-pressure relationship in the valve based on the flow limit, the pressure limit, and a desired flow-pressure characteristic, wherein the flow-pressure relationship is represented by a flow-pressure control diagram, and the flow-pressure characteristic is represented by at least one of a slope and a shape of the diagram; and computing a hydraulic flow rate command based on the determined flow-pressure relationship and the monitored load pressure of the valve.

2. The method of claim 1, further including transforming a cylinder velocity limit and a cylinder force limit set by an operator input into the flow limit and the pressure limit of the valve.

3. The method of claim 2, further including modulating the operator input into the cylinder velocity limit and the cylinder force limit.

4. The method of claim 1, wherein the load pressure of the valve is monitored at an outlet port of the valve.

5. The method of claim 1, further including determining a pressure drop across the valve, and computing a command signal to actuate the valve based on the pressure drop and the hydraulic flow rate command.

6. The method of claim 5, the pressure drop across the valve is determined by monitoring an inlet port pressure and an outlet port pressure of the valve.

7. A method for providing a plurality of flow-pressure relationships in a valve in fluid communication with a pump and a hydraulic actuator, comprising:

selecting a flow limit and a pressure limit of the valve;

determining a first flow-pressure relationship of the plurality of flow-pressure relationships in the valve based on the flow limit, the pressure limit, and a first desired flow-pressure characteristic; and determining a second flow-pressure relationship of the plurality of flow-pressure relationships in the valve based on the flow limit, the pressure limit, and a second desired flow-pressure characteristic different from the first desired flow-pressure characteristic, wherein the flow-pressure relationship is represented by a flow-pressure control diagram, and the flow-pressure characteristic is represented by at least one of a slope and a shape of the diagram.

8. A system for controlling hydraulic flow in a valve in fluid communication with a pump and a hydraulic actuator, the valve having an inlet port and an outlet port, the system comprising:

a pressure sensor assembly for monitoring load pressure; and a flow controller electrically coupled to the pressure sensor assembly, the controller including a flow-pressure control unit configured to determine a flow-pressure relationship in the valve based on a flow limit and a pressure limit of the valve and a desired flow-pressure characteristic, wherein the flow-pressure relationship is represented by a flow-pressure control diagram, and the flow-pressure characteristic is represented by at least one of a slope and a shape of the diagram.

9. The system of claim 8, wherein the flow-pressure control unit is configured to compute a hydraulic flow rate command based on the determined flow-pressure relationship and the monitored load pressure of the valve.

10. The system of claim 9, wherein the controller includes a cylinder transform unit coupled to the flow-pressure control unit, the cylinder transform unit being configured to transform a cylinder velocity limit and a cylinder force limit into the flow limit and the pressure limit of the valve.

11. The system of claim 10, wherein the controller includes a modulation control unit coupled to the cylinder transform unit, the modulation control unit being configured to modulate an operator input into the cylinder velocity limit and the cylinder force limit.

12. The system of claim 9, wherein the controller includes an electronic flow control unit coupled to the flow-pressure control unit and the pressure sensor assembly, the pressure sensor assembly being configured to monitor a pressure drop across the valve, the electronic flow control unit being configured to compute a command signal to actuate the valve based on the pressure drop and the hydraulic flow rate command.

13. The system of claim 8, wherein the controller is preprogrammed with the desired flow-pressure characteristic.

14. The system of claim 13, wherein the controller is preprogrammed with a second desired flow-pressure characteristic.

15. The system of claim 8, wherein the flow-pressure relationship is represented by a flow-pressure control diagram, and the flow-pressure characteristic is represented by a shape of the diagram.

16. A system for controlling hydraulic flow, comprising:
   an independent metering valve having an inlet port and an outlet port;
   a pressure sensor assembly for monitoring load pressure of the independent metering valve; and
   a flow controller electrically coupled to the pressure sensor assembly, the controller including:
      a flow-pressure control unit configured to determine a flow-pressure relationship in the independent metering valve based on a flow limit and a pressure limit of the valve and a desired flow-pressure characteristic; and
      a flow-pressure control unit configured to compute a hydraulic flow rate command based on the determined flow-pressure relationship and the monitored load pressure of the independent metering valve,
   the controller being preprogrammed with the desired flow-pressure characteristic, wherein the flow-pressure relationship is represented by a flow-pressure control diagram, and the flow-pressure characteristic is represented by at least one of a slope and a shape of the diagram.

17. The system of claim 16, wherein the flow-pressure control unit is configured to determine a second flow-pressure relationship in the independent metering valve based on the flow limit and the pressure limit of the independent metering valve and a second desired flow-pressure characteristic.

18. A method for controlling movement of a hydraulic actuator, comprising:
   storing predetermined valve operational characteristics;
   generating input signals based on movement of an input device;
   simulating a flow-pressure relationship based on the input signals and the predetermined valve operational characteristics, wherein the flow-pressure relationship is represented by a flow-pressure control diagram, and the flow-pressure characteristic is represented by at least one of a slope and a shape of the diagram;
   generating a valve command based on the flow-pressure simulation; and
   causing movement of the actuator through communication of the valve command with a control valve in fluid communication with the actuator.

19. The method for claim 18, wherein the flow-pressure simulation provides is a flow-pressure relationship of an open center system.

* * * * *